2,944,913

STARCH DEXTRINS AND METHOD OF MAKING SAME

John D. Commerford, St. Louis County, and Barrett L. Scallet, Clayton, Mo., assignors to Anheuser-Busch, Incorporated, St. Louis, Mo., a corporation of Missouri No Drawing. Filed Nov. 17, 1958, Ser. No. 774,165

6 Claims. (Cl. 106—213)

This invention relates generally to starch dextrins, and more particularly to novel starch dextrins having improved properties and to a novel method for preparing them. Specifically, the present invention relates to the preparation of dextrins from modified or unmodified starch which previously has been treated with a polyfunctional reagent to cause cross-linking between the hydroxyl groups of the starch molecules with a resultant change in the viscosity of a paste prepared therefrom.

Dextrins are used principally in the field of adhesives. There are many types of dextrins that may be used, depending on the particular type of adhesive required. For example, case sealing adhesives require dextrins which give the properties of moderate tack and bond strength. Furthermore, in a case sealing adhesive the setting time is not extremely critical, while the cost is important. That is, an adhesive with a high yield is desired. Other dextrin adhesives such as bottom or shoulder adhesives have other requirements, depending on the particular machine and operation in which they are used. Also, when white or light colored paper is used, a white dextrin is required, however, in the higher solubles range, the dextrins are off-white or yellow, and are thus undesirable for this purpose.

To meet all of these varied needs, a dextrin manufacturer provides a series of products whose properties vary from mildly converted white dextrins to the yellow canaries and British gums which are highly converted, that is, the starch originally present has been extensively modified during the dextrinization process. Correspondingly, solubles range from nearly insoluble to 100% solubles. The viscosities of the dextrins likewise vary. The problem is, usually, that of matching one of these endless types of dextrins to the requirements of the adhesive.

One of the main difficulties encountered with present dextrin adhesives is their tendency to exhibit an increase in viscosity with age. This property is generally referred to as retrogradation or setback, and is caused by starch molecules, which had been dispersed and highly hydrated, combining to form aggregates. Most starch authorities are of the opinion that the straight chain portion of starch, the amylose fraction, is mainly responsible for this phenomenon. Generally, the more highly converted dextrins exhibit a more stable viscosity; however, this is not necessarily so in the presence of borax and caustic.

The principal object of the present invention is to provide a novel dextrin and method of making same. Another object is to provide a dextrinized cross-linked starch product which will have a greatly decreased tendency toward retrogradation when pasted. A further object is to provide a dextrin which has a lighter color for a given solubles content than dextrins presently available.

Another object of this invention is to provide adhesives made from the novel dextrinized cross-linked starch products of this invention, with said adhesives having less tendency toward retrogradation than similar adhesives made from normal dextrins.

Still another object is to provide a novel method for producing dextrins having the above described characteristics. A still further object is to provide a novel method of producing dextrins having any desired degree of conversion using a lower temperature and shorter reaction time than heretofore possible.

These and other objects and advantages will become apparent hereinafter.

We have found a method of preparing dextrins having decreased tendency to retrograde, and which, for a given degree of conversion, are lighter in color than the normal product presently available. The preferred process of the present invention comprises treating a modified or an unmodified starch slurry with a polyfunctional reagent followed by dewatering, drying, and dextrinization of the resulting product.

The invention further consists in the novel starch dextrin hereinafter described and claimed, and in the method of making said novel starch dextrin. A detailed description of the present invention follows.

An example of a cross-linked starch product suitable for use in this invention is the product resulting from the reaction of starch with cyanuric chloride. This reaction can be carried out at a temperature of between about 32° F. and about 140° F. with from about 0.01% to about 0.21% by weight reagent at a pH value between about 2 and about 10 for between about 5 minutes to about 12 hours. The reaction is followed by filtering and drying the resultant product. This complete reaction procedure is described in U.S. Patent No. 2,805,220 dated September 3, 1957. The modified starch product resulting from the above described reaction is then powdered and redried to a moisture content of about 6 to about 9%, and converted to a dextrin, using a dilute mineral acid, preferably up to about 600 ml. of 28% HCl per 1000 lb. starch, and heating the acidified starch at a temperature of from about 180° F. to about 350° F. for from about 1 hour to about 8 hours, then cooling, screening and bagging the product in the usual manner. The dextrinization treatment can be carried out in any known manner, including the preparation of British gums without an acid treatment, however, because of existing plant facilities we prefer to use the hereinbefore described procedure.

In addition to the viscosity stability imparted to adhesives made from these dextrins other improvements are obtained. For example, as hereinbefore mentioned, it is possible to produce dextrins having any desired degree of conversion using the prior art methods. However, utilizing the present invention it is possible to produce any desired converted dextrin using a lower dextrinization temperature and a shorter time of reaction than that thought possible heretofore. Also, dextrins which are produced using this novel process, and which have a high solubles content are not as highly colored as dextrins of the same degree of solubility which are produced by conventional methods.

Whenever the terms solubles, percent solubles, or soluble solids are used in this application, the figure referred to was determined by the following procedure.

DEXTRIN SOLUBLES 10 grams of a dextrin sample is made up to 200 ml. in a 200 ml. volumetric flask by the addition of $H_2O$. The sample is then thoroughly mixed by shaking. The sample is then filtered by gravity or by vacuum. An aliquot of the filtrate is then pipetted into a small beaker whose tare weight is known. The contents of the beaker are then evaporated on a steam bath and dried in an oven. When dry, the beaker is placed in a desiccator to cool and is then weighed.

Calculations:
　　Dry weight of the beaker and contents
　　Tare weight of the beaker
　　Soluble solids in the dextrin $$\frac{\text{Soluble solids}}{\text{Sample weight}} \times 100 = \text{percent solubles in the dextrin}$$

Cyanuric chloride is a member of a group of polyfunctional reagents, such as sodium trimetaphosphate, epichlorohydrin, dimethylolurea, formaldehyde, phosphorus oxychloride, dichloroethyl ether and others, which when reacted with starch in the unswollen granule form, increase the viscosity of the pastes prepared from these treated starches. The reaction is equally effective with corn starch or other starches such as tapioca, wheat, potato, milo and the like. Furthermore, the effects of these reagents are also obtained when they are reacted with modified starches such as oxidized starches, fluidity starches, and the like. Still another class of modified starch products known to have reactivity with these reagents are the starch derivatives such as ethers and esters of the hereinabove mentioned starches.

All of the hereinbefore mentioned unmodified starches and modified starches, when reacted with a polyfunctional reagent (examples of which are hereinbefore given) and dextrinized in accordance with the present invention, give a starch dextrin exhibiting in varying degrees some or all of the novel qualities desired of a product of this invention.

When our novel dextrins are made into pastes for use as adhesives, etc., various additives, such as borax to give the paste more body, sodium hydroxide to increase the paste penetration, and formaldehyde or other preservative to prevent microbial action, may be combined therein without departing from the scope of this invention.

The following examples illustrate our novel process:

*Example I*

A sample of starch is treated with 0.03% cyanuric chloride in accordance with U.S. Patent 2,805,220 to produce a starch product having a moisture content of 11%. This starch product is redried to 8.7% moisture and pulverized in the Mikro-Pulverizer. 2600 grams (g.) of this powdered starch product is placed in a pilot plant dextrin roaster and is sprayed with 25 milliliters (ml.) of dilute hydrochloric acid (HCl), containing 0.735 g. HCl. The acidified starch is then mixed 15 minutes and subsequently heated for 1 hour, the steam pressure of the heating jacket being 20 p.s.i. The maximum temperature which the starch attains is 242° F. The product is then removed from the roaster and cooled. When this product is analyzed by the hereinbefore described method it shows a solubles content of 22.7%.

An adhesive is prepared from this dextrinized product as follows:

240 grams of the above product is slurried with 720 grams of water and is placed in a hot water bath. 30.5 grams of borax decahydrate and 24 grams of 17% sodium hydroxide (NaOH) are added to the slurry. The cooked adhesive is then removed from the heating bath, cooled and strained through a 30 mesh screen. After standing 24 hours in a sealed container the viscosity is 2500 centipoises (cps.), as measured by the Brookfield viscosimeter at 25° C. (spindle #3, 20 r.p.m.). After 12 days the viscosity is 1,990 cp., and after 30 days it is 1,940 cp. After 7 months the viscosity is only 4,240 cp.

In a similar experiment, an adhesive prepared from a normal dextrin has a viscosity of 1,540 cp. after 24 hrs., a viscosity of 2,900 cp. after 14 days, and a viscosity of 5,700 cp. after 30 days. After 3 months the adhesive has set back to a non-flowing gel.

*Example II*

2300 grams of cyanuric chloride treated starch is prepared and treated as in the previous example. This starch product is placed in a pilot plant roaster preheated to 167° F. Heating is continued until the air temperature reaches 185° F. at which time 33 ml. of dilute HCl containing 0.97 g. HCl is sprayed into the roaster. The draft is left open and the starch temperature at the end of the acid addition is 193° F. Heating is continued for 1 hour. A maximum starch temperature of 225° F. is reached during this reaction. The product is then removed from the roaster and cooled. It shows a solubles content of 90% when analyzed by the hereinbefore described method.

An adhesive is prepared using 720 grams of water, 360 grams of the above dextrin, 24 grams of borax and 24 grams of 17% NaOH. The viscosity of this adhesive, measured as before with the Brookfield viscosimeter, after 24 hours at 25° C. is 1060 cp. After 6 weeks the viscosity is only 1150 cp.

*Example III*

105 lbs. of cyanuric chloride treated starch prepared as in Example I is redried to 7.5% moisture and pulverized. It is then acidified with 42 ml. 28% HCl diluted with 210 ml. water. After mixing, the acidified starch is transferred to the dextrin roaster and heated at a maximum temperature of 230° F. for 2 hours. The product is discharged from the roaster and cooled, showing a solubles content of 12.4%.

An adhesive is prepared from this dextrin using 360 parts water; 140 parts dextrin; 20 parts borax; 12 parts 15% NaOH; 1 part formaldehyde; and a trace of Dowicide G.

The viscosity of this adhesive shows an increase of from 1840 cp. to 2380 cp. in 30 days.

A dextrin obtained by treating dry powdered starch in the same manner gives an adhesive which shows an increase in viscosity of from 1900 cp. to 4830 cp. in 30 days.

*Example IV*

110 lbs. of powdered, redried, cyanuric chloride treated starch, prepared as in Example I, is treated with 60.5 ml. 28% HCl diluted with 220 ml. water, and then roasted at a maximum temperature of 230° F. for 2 hrs. This dextrin shows a solubles content of 46%.

An adhesive is prepared from this dextrin using 350 parts water; 240 parts dextrin, 20 parts borax; 16 parts 15% NaOH; 1 part formaldehyde; and a trace of Dowicide G.

The viscosity of the above adhesive shows an increase of from 1860 cp. to 2970 cp. in 30 days.

A normal dextrin adhesive, prepared from redried, powdered starch by treating it in the above manner and made up into the above adhesive formulation, shows a viscosity increase of 11,220 cps. in 30 days.

*Example V*

120 lbs. of cyanuric chloride treated starch prepared as in Example I, including the steps of redrying and pulverizing, is acidified with 60.5 ml. of 28% HCl diluted with 220 ml. of water. It is then roasted for 4 hours at a maximum temperature of 225° F. with the resulting dextrin product having 88.5% solubles.

When untreated starch is converted to a dextrin using the same amount of acid and employing the same conditions as above, a product is obtained which has only 28% solubles. Thus, it is seen that to attain a dextrin having a given solubles content, a shorter reaction time and a lower temperature can be used in dextrinizing our treated starch than can be used in dextrinizing an ordinary untreated starch. This difference in the solubles formation is caused by the fact that the treated starch is converted (dextrinized) faster than the untreated starch.

Furthermore, if a sample of this cyanuric chloride dextrin is compared with a standard dextrin of the same solubles content, it is found that the treated product is white, while the ordinary dextrin material is pale yellow.

Thus, it is seen that for a given solubles content a dextrin made from our treated starch has a lighter color than a dextrin made from ordinary untreated starch.

*Example VI*

103 lbs. of cyanuric chloride treated starch prepared as in Example I, redried and pulverized, as above, is acidified with 46 ml. of 28% HCl diluted with 206 ml. of water. After mixing for 45 minutes the acidified starch is transferred to a roaster and therein converted to a canary dextrin. This particular dextrin product is normally considered as completed when its color matches that of a standard reference which is light brown in color. The usual maximum time for conversion of a normal starch to the dextrin product sought is 6½ hours. In 8¼ hours the present dextrin product attains only a dark yellow color, although the viscosity of this product is below the standard viscosity required for the canary dextrin usually obtained using the same conditions. The lowered viscosity signifies over-conversion. Thus, it is seen that for a given degree of conversion, the color of a dextrin produced from a treated starch product is lighter than the color of a dextrin produced from an untreated normal starch.

The dextrinization step of this invention can be performed in any known manner and using any suitable acid, temperature, and time of reaction. These variables can be varied by those skilled in the art to produce a dextrin having any desired characteristics. The use of any standard dextrinization procedure with the novel starches of this invention produces a novel dextrin which has less set-back when pasted and which is lighter in color for a given solubles content than a normal dextrin produced from an ordinary starch using the same conditions. A dextrin having any desired characteristics can be produced by this invention using a lower temperature and less time than would be necessary to produce a normal dextrin having similar characteristics. These dextrins also have the hereinbefore mentioned characteristics of less set-back and lighter color.

When normal dextrins are used in a typical adhesive formulation and these adhesives are subsequently treated with a cross-linking agent, the resulting product does not exhibit the characteristics of adhesives made using the novel dextrins produced by this invention. Moreover, when normal dextrins are reacted with a cross-linking agent after dextrinization, they do not exhibit the same characteristics as our dextrinized cross-linked starch products. It is believed that the desirable characteristics of our novel dextrins result from a relocation of the dextrinizing action caused by the cross-links in the starch molecules, and cross-linking after dextrinization does not give the same type of molecular arrangement.

Therefore it can be seen that we have invented a novel starch dextrin and method of making same which fulfills all the objects and advantages sought therefor.

This invention is further intended to cover all changes and modifications of the examples of the invention herein chosen for purposes of the disclosure, which do not constitute departures from the spirit and scope of the invention.

What is claimed is:

1. A process for producing a cross-linked dextrin comprising treating starch with a reagent having at least two reactive groups to cross-link the starch moleclues by covalently bonding each of said reactive groups with the oxygen atom of one of the hydroxyl groups of an associated starch molecule, and then dextrinizing the cross-linked starch molecules.

2. A product produced according to the process defined in claim 1.

3. A process for producing a cross-linked starch dextrin product including the steps of cross-linking starch with from about 0.001 mole to about 0.02 mole per mole of anhydro glucose unit of a reagent having at least 2 reactive sites capable of reacting with starch, and dextrinizing the resulting cross-linked starch for from about 1 hour to about 8 hours at a temperature of from about 180° F. to about 350° F. in the presence of from 0.0 to about 0.003 mole HCl per mole anhydro glucose unit.

4. A process for producing a cross-linked dextrin including the steps of reacting from 0.01% to about 0.21% by weight based on the weight of dry starch present, of cyanuric chloride with starch, said reaction being at a temperature of between about 32° F. and about 140° F. and at a pH between about 2 and about 10 for between about 5 minutes to about 12 hours, and dextrinizing the resultant cross-linked starch product with the equivalent of up to about 600 milliliters 28% HCl per 1000 pounds starch at a temperature of from about 180° F. to about 350° F. for from about 1 hour to about 8 hours, said cross-linked starch dextrin being characterized by its paste having substantially less set-back than similar paste made from a dextrin produced from normal starch.

5. A substantially non-retrograding adhesive mix consisting essentially of the product defined in claim 1.

6. A process for producing a dextrin adhesive characterized by being substantially non-retrograding when mixed with water comprising treating starch with a reagent having at least two reactive groups to cross-link the starch molecules by covalently bonding each of said reactive groups with the oxygen atom of one of the hydroxyl groups of an associated starch molecule, and then dextrinizing the cross-linked starch molecules, adding a body-increasing agent to the dextrinized cross-linked starch molecules, and adding a preservative.

References Cited in the file of this patent
UNITED STATES PATENTS

| | | |
|---|---|---|
| 2,115,157 | Bulfer et al. | Apr. 26, 1938 |
| 2,220,988 | Bauer et al. | Nov. 12, 1940 |
| 2,805,220 | Gerwitz | Sept. 3, 1957 |